US009421464B2

(12) United States Patent
Lanzoni et al.

(10) Patent No.: US 9,421,464 B2
(45) Date of Patent: Aug. 23, 2016

(54) SYSTEM AND METHOD FOR PROVIDING PERFORMANCE IN A PERSONAL GAMING CLOUD (71) Applicant: Dell Products, LP, Round Rock, TX (US)

(72) Inventors: Thomas Lanzoni, Cedar Park, TX (US); Gary D. Huber, Austin, TX (US); Richard W. Schuckle, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 530 days.

(21) Appl. No.: 13/899,682

(22) Filed: May 22, 2013

(65) Prior Publication Data
US 2014/0349763 A1 Nov. 27, 2014

(51) Int. Cl.
*A63F 13/323* (2014.01)
*A63F 13/358* (2014.01)
*H04L 29/06* (2006.01)
*H04L 29/08* (2006.01)
*A63F 13/355* (2014.01)
*A63F 13/327* (2014.01)
*A63F 13/335* (2014.01)

(52) U.S. Cl.
CPC ............. *A63F 13/323* (2014.09); *A63F 13/327* (2014.09); *A63F 13/335* (2014.09); *A63F 13/355* (2014.09); *A63F 13/358* (2014.09); *H04L 67/104* (2013.01); *H04L 67/38* (2013.01); *A63F 2300/8082* (2013.01)

(58) Field of Classification Search
None
See application file for complete search history.

(56) References Cited

U.S. PATENT DOCUMENTS

| | | | | |
|---|---|---|---|---|
| 7,471,665 B2 * | 12/2008 | Perlman | .............. | H04L 63/0428 370/315 |
| 7,593,361 B2 * | 9/2009 | Perlman | ................ | H04W 88/04 370/326 |
| 7,684,752 B2 * | 3/2010 | Perlman | ............. | H04B 7/18517 370/315 |
| 8,019,905 B2 | 9/2011 | Wu et al. | | |
| 8,862,872 B2 * | 10/2014 | Vanderveen | ........ | H04L 63/0823 713/156 |
| 8,904,458 B2 * | 12/2014 | Kortum | .............. | H04N 7/17318 725/142 |
| 2002/0194589 A1 * | 12/2002 | Cristofalo | .............. | H04N 7/165 725/32 |
| 2007/0050244 A1 * | 3/2007 | Stevens | .................. | G06Q 30/02 705/14.1 |
| 2007/0201477 A1 * | 8/2007 | Ippach | .............. | H04L 29/06027 370/392 |
| 2007/0214483 A1 * | 9/2007 | Bou-Abboud | ......... | G06Q 30/02 725/96 |
| 2007/0219856 A1 * | 9/2007 | Ahmad-Taylor | ..... | G06Q 10/103 705/301 |

(Continued)

Primary Examiner — Ninos Donabed
(74) Attorney, Agent, or Firm — Larson Newman, LLP (57) ABSTRACT A personal gaming system includes a home network router and a gaming host operable to request a bandwidth allocation from the home network router, the bandwidth allocation being associated with a multimedia stream between the gaming host and a client system, and provide the multimedia stream to the home network router for routing to the client system, where the multimedia stream is within the bandwidth allocation. The home network router is operable to receive the request for the bandwidth allocation from the gaming host, determine whether an available bandwidth for data traffic between the gaming host and the client system is greater than the bandwidth allocation, and if so to allocate the bandwidth allocation for data traffic between the gaming host and the client system, and provide an indication to the gaming host that the bandwidth allocation is allocated for data traffic between the gaming host and the client system.

17 Claims, 5 Drawing Sheets

(56) References Cited

U.S. PATENT DOCUMENTS

| | | | |
|---|---|---|---|
| 2007/0220566 A1* | 9/2007 | Ahmad-Taylor | H04N 21/44222 725/89 |
| 2007/0276905 A1* | 11/2007 | Durand | H04L 29/12066 709/203 |
| 2007/0288963 A1* | 12/2007 | Ahmad-Taylor | H04H 60/72 725/46 |
| 2007/0288982 A1* | 12/2007 | Donahue | H04H 20/12 725/125 |
| 2008/0084877 A1* | 4/2008 | Brzozowski | H04L 12/2801 370/389 |
| 2008/0120402 A1* | 5/2008 | Brown | H04L 41/085 709/223 |
| 2008/0141137 A1* | 6/2008 | Cleary | H04N 7/17318 715/733 |
| 2009/0234983 A1* | 9/2009 | Golden | G06F 3/14 710/30 |
| 2009/0296700 A1* | 12/2009 | Stevens | H04L 12/5695 370/389 |
| 2009/0318235 A1* | 12/2009 | Ashida | A63F 13/12 463/42 |
| 2010/0083362 A1* | 4/2010 | Francisco | H04N 7/17318 726/9 |
| 2010/0125914 A1 | 5/2010 | Dandekar et al. | |
| 2010/0273557 A1* | 10/2010 | Miyaki | A63F 13/12 463/42 |
| 2011/0069634 A1* | 3/2011 | Hajiaghayi | H04L 45/00 370/254 |
| 2011/0126255 A1* | 5/2011 | Perlman | A63F 13/12 725/116 |
| 2011/0292861 A1* | 12/2011 | Gou | H04W 76/002 370/312 |
| 2011/0305186 A1* | 12/2011 | Gou | H04L 12/189 370/312 |
| 2011/0310785 A1* | 12/2011 | Gou | H04W 72/005 370/312 |
| 2012/0184373 A1 | 7/2012 | Kim et al. | |
| 2012/0283017 A1 | 11/2012 | Ahiska et al. | |
| 2013/0116022 A1* | 5/2013 | Davison | A63F 13/5375 463/9 |
| 2014/0344457 A1* | 11/2014 | Bruno, Jr. | A63F 13/12 709/226 |

\* cited by examiner

SYSTEM AND METHOD FOR PROVIDING PERFORMANCE IN A PERSONAL GAMING CLOUD

FIELD OF THE DISCLOSURE

This disclosure relates generally information handling systems, and more particularly relates to providing performance in a personal gaming cloud.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems. An information handling system can be used for playing computer-based games.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
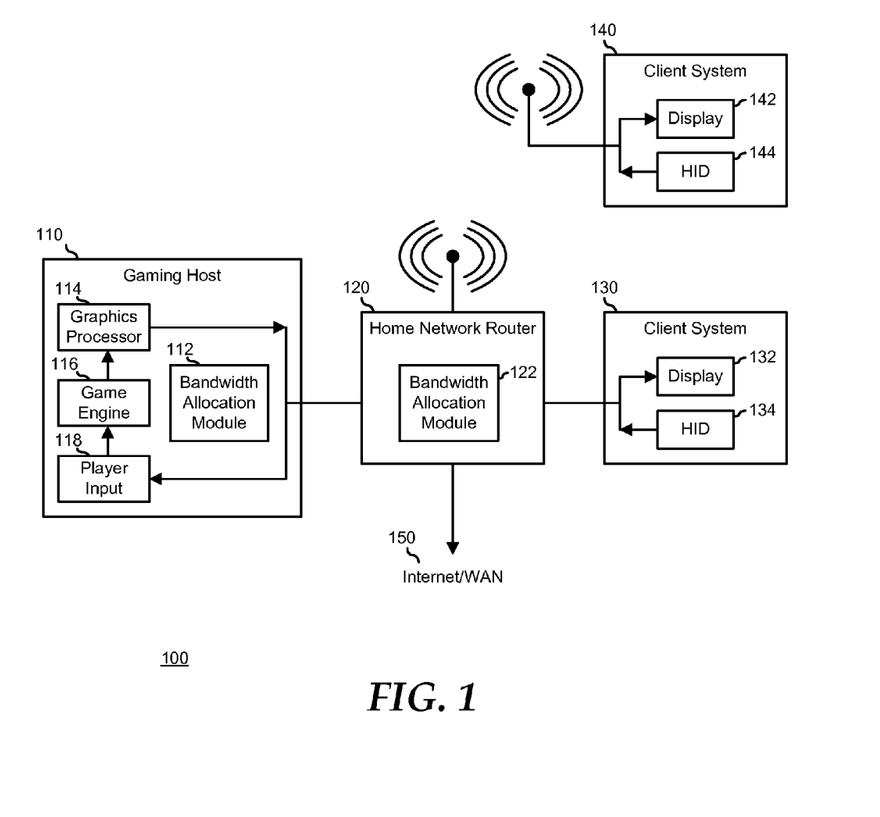
FIG. 1 is a block diagram illustrating a personal gaming cloud according to an embodiment of the present disclosure.

FIG. 1 illustrates an embodiment of a personal gaming cloud 100 including a gaming host system 110, a home network router 120, and client systems 130 and 140. Gaming host system 110 is connected to client systems 130 and 140 and to a wide-area network (WAN) 150, such as the Internet, via home network router 120. Personal gaming cloud 100 operates to provide a rich gaming experience where games are hosted on gaming host system 110 and users of client systems 130 and 140 interact with their respective systems to play the games. Gaming host system 110 represents an information handling system such as a high-performance personal computer (PC), a game console, or another information handling system adapted to host a client-based game operation, and includes one or more processors, memory, storage, and input/output (I/O) devices as needed to store and execute a game program. In particular, gaming host system 110 includes a graphics processor 114, a game engine 116, and a player input module 118, that each can be implemented as hardware, as software, or as a combination thereof, as needed or desired.

Home network router 120 represents a consumer electronic device for creating a small network, such as a combination Ethernet/Wireless router, that operates to provide a sub-network that is isolated from WAN 150. In a particular embodiment, home network router 120 permits one or more of gaming host system 110 and client systems 130 and 140 to access WAN 150 by performing a network address translation (NAT) function on transactions that are made between personal gaming cloud 100 and WAN 150. Home network router 120 includes several network cable receptacles that are connected to various elements of personal gaming cloud 100, such as gaming host system 110 and client system 130. For example, home network router 120 can include RJ45 receptacles for receiving Ethernet CAT5 or CAT6 cables, Universal Serial Bus (USB) connectors, External Serial ATA (eSATA) connectors, IEEE-1394 Firewire connectors, other network cable receptacles, or a combination thereof, as needed or desired. Home network router 120 also includes one or more wireless communication interfaces such as an IEEE 802.11 a/b/g/n/ac WiFi interface, or the like, that are connected to other elements of personal gaming cloud 100, such as client system 140.

Client system 130 represents an electronic device for providing a user with a personal computing experience, and that can connect to personal gaming cloud 100 via home network router 120. For example, client system 130 can include a PC, a television, a television set-top box, a tethered mobile device such as a smart phone or a tablet device, or the like. Client system 130 can include a network cable receptacle that permits the client system to be connected directly to home network router via a suitable network or peripheral cable. In a particular embodiment, client system 130 can operate to store and run a game application that permits the user to play a game on the client system. For example, client system 130 can download and install a game application from a DVD-ROM drive, from an application repository on WAN 150 such as a game store or game website, or otherwise download and install a game as needed or desired.

Client system 140 represents a mobile electronic device similar to client system 130, and that can connect wirelessly to personal gaming cloud 100 via home network router 120. For example, client system 130 can include a WiFi enabled PC, television, television set-top box, or game console, a smart phone, a tablet device or another wireless electronic device, or the like. In a particular embodiment, client system 140 can operate to store and run a game application that permits the user to play a game on the client system. For example, client system 140 can download and install a game application from a DVD-ROM drive, from an application repository on WAN 150 such as a game store or game website, or otherwise download and install a game as needed or desired.

In another embodiment, a game application can include a client-based portion and a host-based portion. The client-based portion operates on one or more of client systems 130 and 140 to receive audio and video game media content from gaming host 110, and provides gaming feedback to the gaming host. Here, the host-based portion operates on gaming host 110 to render rich audio/video content for streaming to client systems 130 and 140, and to receive interactive input data from the client systems to manipulate the game program. As such, gaming host 110 operates to execute the logical and decisional aspects of the game program in game engine 116, to process, render and transmit the audio and video game media content in graphics processor 114, and to receive the gaming feedback at player input 118. Gaming host 110 then provides multimedia content streams to client systems 130 and 140, and the client-based portions of the game program display the multimedia content stream on a display 132 of client system 130 and on a display 142 of client system 140. Here, the multimedia content stream can be displayed using minimal processing resources of client systems 130 and 140. The users provide feedback to gaming host 110 via a human interface device (HID) 134 on client system 130 and a HID 144 on client system 140. HID 134 and HID 144 represent input devices of respective client systems 130 and 140. For example, HIDs 134 and 144 can include a touch screen, a mouse, a keyboard, a game console controller, or another input device that provides user feedback.

In a particular embodiment, users of client systems 130 and 140 obtain a rich gaming experience when they receive a high bandwidth multimedia stream from gaming host 110, and when the input lag between a user feedback input, and the resulting game response is low. In particular, gaming host 110 can provide a multimedia stream to one or more of client systems 130 that includes high frame rate and high resolution video content and high bit rate audio content. For example, a particular action game may be best played when the video content is generated at a 60 frames per second (FPS) frame rate, and the video resolution is as high as the resolution of display 132 or 142, and the audio content is uncompressed or lossless audio content.

However, providing such high quality multimedia content on personal gaming cloud 100 may be impossible due to data bandwidth limitations within the personal gaming cloud. Here, one or more of the connections between home network router 120 and the other elements of personal gaming cloud 100 may be a lower bandwidth connection than would be needed to communicate the highest quality multimedia content from gaming host 110 to client systems 130 or 140. For example, home network router 120 may be only Wireless-g capable, and be placed a long distance from client system 140, such that the maximum connection bandwidth is 30 megabits per second (mb/s), but the highest quality multimedia content for an action game may need to provide a multimedia stream at 40 mb/s.

In another case, providing such high quality multimedia content on personal gaming cloud 100 may be impractical due to data traffic loading within the personal gaming cloud. Here, all of the connections between home network router 120 and the other elements of personal gaming cloud 100 may be a sufficiently large bandwidth connection to communicate the highest quality multimedia content from gaming host 110 to client systems 130 or 140. However, because all of the network traffic is not dedicated solely to the gaming traffic, it may be impractical to provide the highest quality of multimedia content in all cases. For example, the connection between home network router 120 and gaming host 110 may be a 100 mb/s Ethernet connection. However, if a user of client system 130 has directed gaming host 110 to download a program that is utilizing 80 mb/s of the connection bandwidth, then it may be impractical to attempt to stream the 40 mb/s action game content to client system 140, even if the connection between home network 120 is a Wireless-n capable router and the connection between the home network router and client system 140 is capable of up to 600 mb/s.

In a particular embodiment, gaming host 110 operates to request home network router 120 to reserve a desired bandwidth for multimedia streams to one or more of client systems 130 and 140. Here, home network router 120 includes a bandwidth allocation module 122 that communicates with bandwidth allocation module 112 to reserve the bandwidth for a particular multimedia stream. For example, gaming host 110 can determine that the highest quality gaming experience is achieved by sending a 40 mb/s multimedia stream to client system 130. Here bandwidth allocation module 112 sends a request to bandwidth allocation module 122 to reserve 40 mb/s of bandwidth between gaming host 110 and client system 130, and bandwidth allocation module 122 reserves the requested bandwidth on home network router 120 for the multimedia stream.

When the bandwidth requested by gaming host 110 is unavailable at home network router 120, bandwidth allocation module 112 and bandwidth allocation module 122 can negotiate to reserve a reduced bandwidth for the multimedia stream. If a reduced bandwidth is available, bandwidth allocation module 122 informs bandwidth allocation module 112 that the reduced bandwidth is reserved for the multimedia stream to client system 130. Here, gaming host 110 directs graphics processor 114 or gaming engine 116 to reduce the frame rate or the resolution of the game, to increase the compression of the stream to client system 130, or a combination of thereof, as needed or desired, in order to reduce the bandwidth of the multimedia stream to be within the reserved bandwidth allocation. For example, home network router 120 may only have 30 mb/s of available bandwidth for the multimedia stream to client system 130, and so gaming host 110 can do one or more of reducing the frame rate or the resolution of the game, or increasing the compression of the stream to client system 130 in order to reduce the multimedia stream to 30 mb/s. In this case, the quality of the gaming experience achieved by the users is reduced. However, because the bandwidth allocation is reserved in home network router 120, the gaming experience is consistent, the video content is acceptable, and the game play is without perceptible lag or loss.

If home network router 120 is unable to allocate any bandwidth to a particular multimedia stream, then gaming host 110 can proceed to execute the game on a best-effort basis through the home network router. Here, the game play is potentially halting, with lags both in user feedback response and in video and audio flow. In other words, the audio and video experience of the user may suffer because the content is not smoothly provided to client systems 130 and 140. In another embodiment, gaming host 110 can further reduce the frame rate or resolution, or further increase the compression of the multimedia stream in order to reduce the likelihood of lag in the game play experienced by the users.

Figure 2:
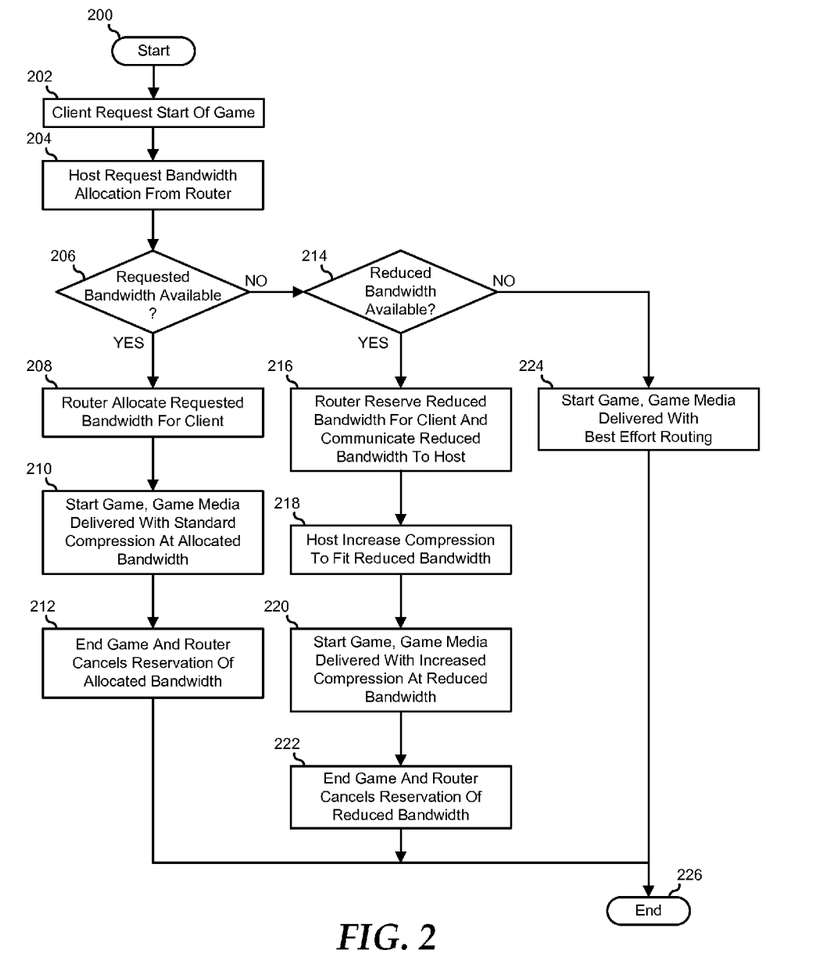
FIGS. 2-4 are flowcharts illustrating methods of allocating bandwidth in the personal gaming cloud of FIG. 1.

FIG. 2 illustrates a method of reserving a desired bandwidth for multimedia streams in personal gaming cloud 100, starting at block 200. Client system 130 or 140 requests to start a game on gaming host 110 in block 202. Gaming host 110 requests a bandwidth allocation from home network router 120 in block 204. A decision is made as to whether or not the requested bandwidth is available in home network router 120 in decision block 206. If so, the "YES" branch of decision block 206 is taken and home network router 120 reserves the requested bandwidth for the multimedia stream to client system 130 or 140 in block 208. Gaming server 110 starts the game, delivering the multimedia stream to client system 130 or 140 with a standard compression rate at the allocated bandwidth in block 210. A user of client system 130 or 140 ends the game play and home network router 120 cancels the reservation of the allocated bandwidth in block 212 and the method ends in block 226.

Returning to decision block 206, if the requested bandwidth is not available in home network router 120, the "NO" branch of decision block 206 is taken and a decision is made as to whether or not a reduced bandwidth is available in home network router 120 in decision block 214. If so, the "YES" branch of decision block 214 is taken and home network router 120 reserves a reduced bandwidth allocation for the multimedia stream to client system 130 or 140 in block 216. Gaming host 110 reduces the frame rate or the resolution, or increases the compression of the multimedia stream in block 218. Gaming server 110 then starts the game, delivering the multimedia stream to client system 130 or 140 with the increased compression rate at the reduced bandwidth in block 220. A user of client system 130 or 140 ends the game play and home network router 120 cancels the reservation of the reduced bandwidth in block 222 and the method ends in block 226. Returning to decision block 214, if a reduced bandwidth is not available in home network router 120, the "NO" branch of decision block 214 is taken, gaming server 110 starts the game, delivering the multimedia stream to client system 130 or 140 with further increased compression rate with a best effort made by home network router 120 to deliver the multimedia stream to client system 130 or 140, and the method ends in block 226. In a particular embodiment, a user of client system 130 or 140 is notified that a sufficient bandwidth for a quality gaming experience is not available.

In a particular embodiment, home network router 120 operates to determine that the amount of allocated bandwidth for a particular multimedia stream is subject to change. Here, the amount of allocated bandwidth can be forced to be reduced, or can be permitted to be increased. For example, where a new content stream from WAN 150 is added, bandwidth in home network router 120 may be constrained and the allocated bandwidth for a multimedia stream between gaming host 110 and one of client systems 130 or 140 may need to be decreased, and when the content stream from the WAN is done, the allocated bandwidth may be increased. Where the allocated bandwidth is forced to be reduced, bandwidth allocation module 122 informs bandwidth allocation module 112 that the reduced bandwidth is reserved for the multimedia stream to client system 130 or 140, and gaming host 110 reduces the bandwidth of the multimedia stream by reducing the frame rate or the resolution of the game, or increasing the compression of the stream to the client system 130 or 140 in order to reduce the bandwidth of the multimedia stream to be within the new reserved bandwidth allocation. Where the allocated bandwidth is permitted to be increased, bandwidth allocation module 122 informs bandwidth allocation module 112 that the increased bandwidth is reserved for the multimedia stream to client system 130 or 140, and gaming host 110 increases the bandwidth of the multimedia stream by increasing the frame rate or the resolution of the game, or decreasing the compression of the stream to the client system 130 or 140 in order to increase the bandwidth of the multimedia stream to be within the new reserved bandwidth allocation.

Figure 3:
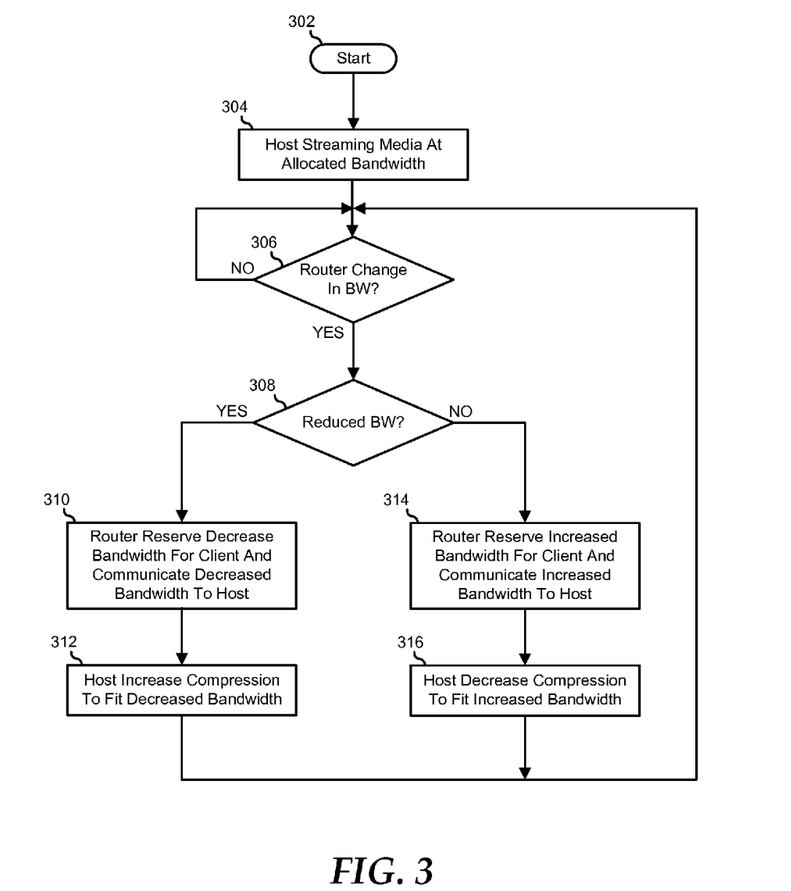

FIG. 3 illustrates a method of home network router 120 changing the amount of allocated bandwidth for a particular multimedia stream, starting in block 302. Gaming host 110 provides a multimedia stream to one or more of client systems 130 and 140 at an allocated bandwidth in block 304. A decision is made as to whether or not home network router 120 is initiating a change in the allocated bandwidth in decision block 306. If not, the "NO" branch of decision block 306 is taken and the method loops back to decision block 306. If home network router 120 is initiating a change in the allocated bandwidth, the "YES" branch of decision block 306 is taken and a decision is made as to whether or not the change is to reduce the allocated bandwidth in decision block 308. If so, the "YES" branch of decision block 308 is taken and home network router 120 reserves a decreased bandwidth for the multimedia stream between gaming host 110 and client system 130 or 140 and communicates the decrease to the gaming host in block 310. Gaming host 110 decreases the bandwidth of the multimedia stream by decreasing the frame rate or the resolution of the game, or increasing the compression of the stream to the client system 130 or 140 in order to decrease the bandwidth of the multimedia stream to be within the new reserved bandwidth allocation in block 312, and the method loops back to decision block 306 where a decision is made as to whether or not home network router 120 is initiating a change in the allocated bandwidth.

Returning to decision block 308, if the change is not to reduce the allocated bandwidth, the "NO" branch of decision block 308 is taken and home network router 120 reserves an increased bandwidth for the multimedia stream between gaming host 110 and client system 130 or 140 and communicates the increase to the gaming host in block 314. Gaming host 110 increases the bandwidth of the multimedia stream by increasing the frame rate or the resolution of the game, or decreasing the compression of the stream to the client system 130 or 140 in order to increase the bandwidth of the multimedia stream to be within the new reserved bandwidth allocation in block 316, and the method loops back to decision block 306 where a decision is made as to whether or not home network router 120 is initiating a change in the allocated bandwidth.

Similarly, gaming host 110 operates to increase or decrease the amount of requested bandwidth for a particular multimedia stream. Where the requested bandwidth is increased, bandwidth allocation module 112 request bandwidth allocation module 122 to increase the allocated bandwidth for a multimedia stream to client system 130 or 140, as describe in FIG. 2, above. Where the requested bandwidth is decreased, bandwidth allocation module 112 request bandwidth allocation module 122 to decrease the allocated bandwidth for a multimedia stream to client system 130 or 140.

Figure 4:
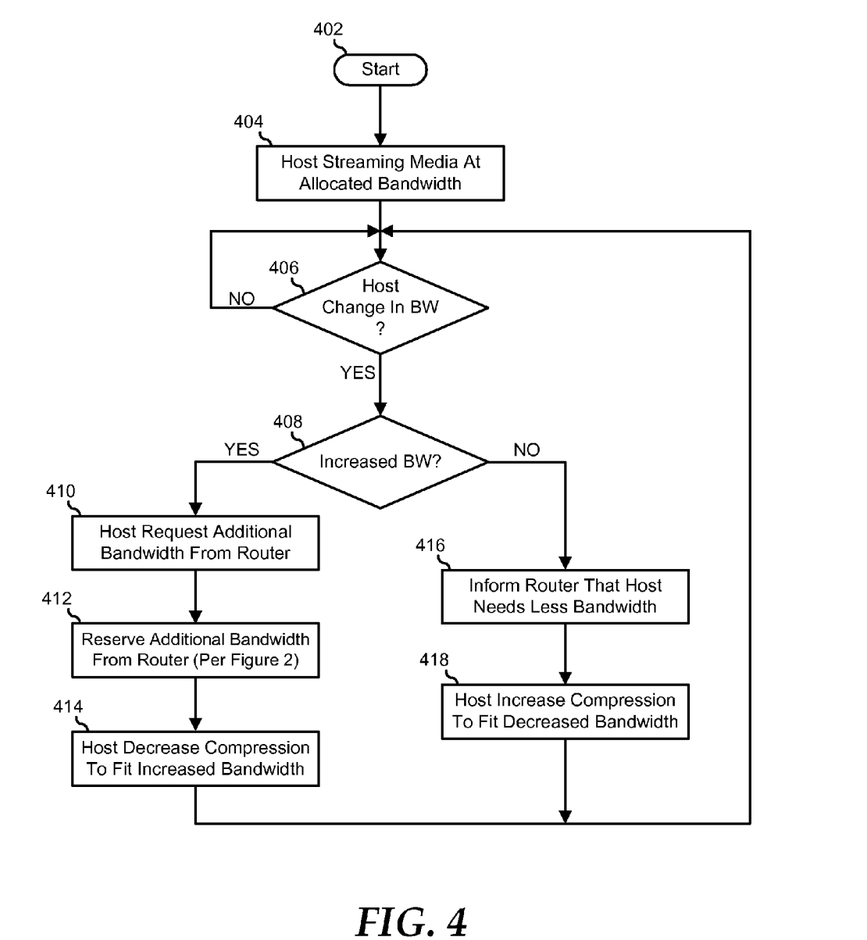

FIG. 4 illustrates a method of gaming host 110 requesting a change in the amount of allocated bandwidth for a particular multimedia stream, starting in block 402. Gaming host 110 provides a multimedia stream to one or more of client systems 130 and 140 at an allocated bandwidth in block 404. A decision is made as to whether or not gaming host 110 is requesting a change in the allocated bandwidth in decision block 406. If not, the "NO" branch of decision block 406 is taken and the method loops back to decision block 406. If gaming host 110 is requesting a change in the allocated bandwidth, the "YES" branch of decision block 406 is taken and a decision is made as to whether or not the change is to increase the allocated bandwidth in decision block 408. If so, the "YES" branch of decision block 408 is taken and gaming host 110 requests an increase in the allocated bandwidth from home network router 120 in block 410. Home network router 120 reserves increased bandwidth for the multimedia stream between gaming host 110 and client system 130 or 140 by the method described in FIG. 2 in block 412. Gaming host 110 increases the bandwidth of the multimedia stream by increasing the frame rate or the resolution of the game, or decreasing the compression of the stream to the client system 130 or 140 in order to increase the bandwidth of the multimedia stream to be within the new reserved bandwidth allocation in block 414, and the method loops back to decision block 406 where a decision is made as to whether or not the gaming host is requesting a change in the allocated bandwidth.

Returning to decision block 408, if the change is not to increase the allocated bandwidth, the "NO" branch of decision block 408 is taken and gaming host 110 informs home network router 120 that the gaming host needs decreased bandwidth for the multimedia stream to client system 130 or 140 in block 416. Gaming host 110 decreases the bandwidth of the multimedia stream by decreasing the frame rate or the resolution of the game, or increasing the compression of the stream to the client system 130 or 140 in order to decrease the bandwidth of the multimedia stream to be within the new reserved bandwidth allocation in block 318, and the method loops back to decision block 406 where a decision is made as to whether or not the gaming host is requesting a change in the allocated bandwidth.

While the multimedia streams between gaming host 110 and client systems 130 and 140 have been described in the context of host-based and client-based game programs, the teachings of this disclosure are not limited to a gaming context. As such, in a particular embodiment, the multimedia stream is other media content, such as streaming movies, video content, audio content, VoIP content or other multimedia streams as needed or desired. In a particular embodiment, home network router 120 operates to allocate bandwidth based upon the Internet Protocol (IP) addresses included in the data streams between gaming host 110 and client systems 130 and 140, upon a deep packet inspection of the data streams that identify the streams as being associated with a particular multimedia stream, or upon another method of identifying data traffic within personal gaming cloud 100.

Figure 5:
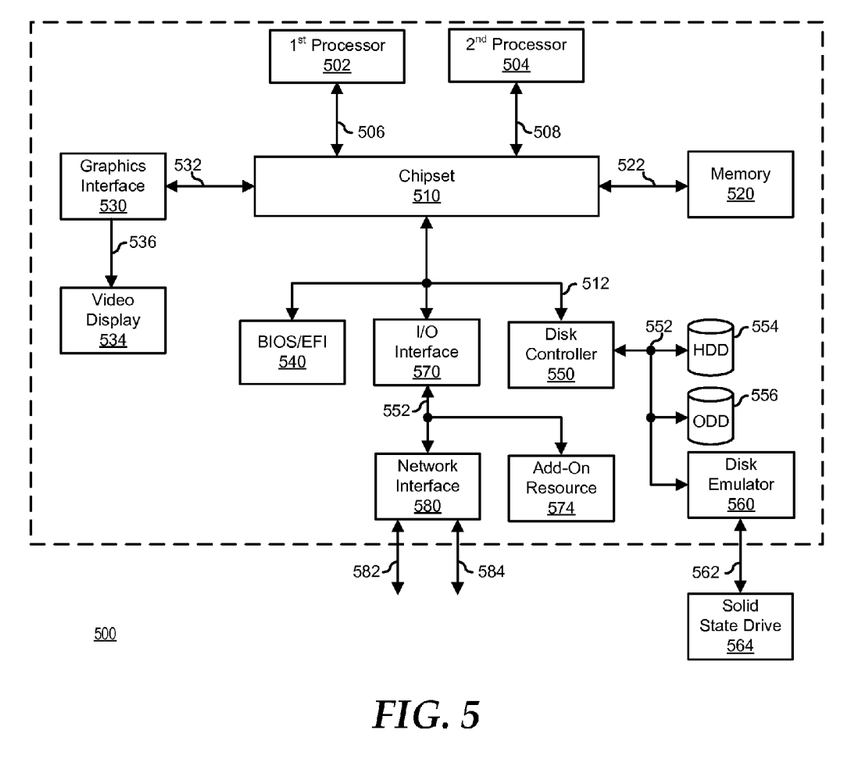
FIG. 5 is a block diagram illustrating a generalized information handling system according to an embodiment of the present disclosure.

FIG. 5 illustrates a generalized embodiment of information handling system 500. For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described above, and operates to perform one or more of the methods described above. Information handling system 500 includes a processors 502 and 504, a chipset 510, a memory 520, a graphics interface 530, include a basic input and output system/extensible firmware interface (BIOS/EFI) module 540, a disk controller 550, a disk emulator 560, an input/output (I/O) interface 570, and a network interface 580. Processor 502 is connected to chipset 510 via processor interface 506, and processor 504 is connected to the chipset via processor interface 508. Memory 520 is connected to chipset 510 via a memory bus 522. Graphics interface 530 is connected to chipset 510 via a graphics interface 532, and provides a video display output 536 to a video display 534. In a particular embodiment, information handling system 500 includes separate memories that are dedicated to each of processors 502 and 504 via separate memory interfaces. An example of memory 520 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 540 includes BIOS/EFI code operable to detect resources within information handling system 500, to provide drivers for the resources, initialize the resources, and access the resources. BIOS/EFI module 540 includes code that operates to detect resources within information handling system 500, to provide drivers for the resources, to initialize the resources, and to access the resources.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits a solid-state drive 564 to be coupled to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O interface 570 includes a peripheral interface 572 that connects the I/O interface to an add-on resource 574 and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as chipset 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be coupled to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A personal gaming system comprising:
    a home network router; and
    a gaming host coupled to the home network router and operable to:
        request a first bandwidth allocation from the home network router, the first bandwidth allocation being associated with a first multimedia stream between the gaming host and a first client system coupled to the home network router; and
        provide the first multimedia stream to the home network router for routing to the first client system, wherein the first multimedia stream is within the first bandwidth allocation;
    wherein the home network router is operable to:
        receive the request for the first bandwidth allocation from the gaming host;
        determine whether a first available bandwidth for data traffic between the gaming host and the first client system is greater than or less than the first bandwidth allocation; and
        in response to determining that the first available bandwidth is greater than the first bandwidth allocation, to:
            allocate the first bandwidth allocation for data traffic between the gaming host and the first client system; and
            provide a first indication to the gaming host that the first bandwidth allocation is allocated for data traffic between the gaming host and the first client system;
            cease providing the first multimedia stream to the first client system; and
            provide a second indication to the home network router to deallocate the first bandwidth allocation for data traffic between the gaming host and the first client system.

2. The personal gaming system of claim 1, wherein further:
    the home network router is operable, in response to determining that the first available bandwidth is less than the first bandwidth allocation, to:
        allocate a second bandwidth allocation for data traffic between the gaming host and the first client system, wherein the second bandwidth allocation is less than the first bandwidth allocation; and
        provide a second indication to the gaming host that the second bandwidth allocation is allocated for traffic between the gaming host and the first client system; and
    the gaming host is operable to:
        receive the second indication from the home network router; and
        in response to receiving the second indication, to:
            operate on the first multimedia stream to provide a second multimedia stream, wherein the second multimedia stream is within the second bandwidth allocation; and
            provide the second multimedia stream to the home network router for routing to the first client system.

3. The personal gaming system of claim 2, wherein, in operating on the first multimedia stream, the gaming host is further operable to reduce a frame rate of the first multimedia stream.

4. The personal gaming system of claim 2, wherein, in operating on the first multimedia stream, the gaming host is further operable to reduce a resolution of the first multimedia stream.

5. The personal gaming system of claim 2, wherein, in operating on the first multimedia stream, the gaming host is further operable to increase a compression of the first multimedia stream.

6. The personal gaming system of claim 1, wherein the home network router is further operable to:
    determine that a second available bandwidth for traffic between the gaming host and the first client system is less than the first available bandwidth;
    determine if the second available bandwidth is less than the first bandwidth allocation; and
    in response to determining that the second available bandwidth is less than the first bandwidth allocation, to:

allocate a second bandwidth allocation for data traffic between the gaming host and the first client system, wherein the second bandwidth allocation is less than the first bandwidth allocation; and provide a second indication to the gaming host that the second bandwidth allocation is allocated for traffic between the gaming host and the first client system; and wherein the gaming host is operable to:
receive the second indication from the home network router; and
in response to receiving the second indication, to:
operate on the first multimedia stream to provide a second multimedia stream, wherein the second multimedia stream is within the second bandwidth allocation; and
provide the second multimedia stream to the home network router for routing to the first client system;
allocate the first bandwidth allocation for data traffic between the gaming host and the first client system; and
provide a first indication to the gaming host that the first bandwidth allocation is allocated for data traffic between the gaming host and the first client system.

7. The personal gaming system of claim 1, wherein:
the gaming host is further operable to:
request a second bandwidth allocation from the home network router, the second bandwidth allocation being associated with a second multimedia stream between the gaming host and a second client system coupled to the home network router; and
provide the second multimedia stream to the home network router for routing to the second client system, wherein the second multimedia stream is within the second bandwidth allocation; and
the home network router is further operable to:
receive the request for the second bandwidth allocation from the gaming host;
determine whether a second available bandwidth for data traffic between the gaming host and the second client system is greater than or less than the second bandwidth allocation; and
in response to determining that the second available bandwidth is greater than the second bandwidth allocation, to:
allocate the second bandwidth allocation for data traffic between the gaming host and the second client system; and
provide a second indication to the gaming host that the second bandwidth allocation is allocated for data traffic between the gaming host and the second client system.

8. A method comprising:
requesting by a gaming host a first bandwidth allocation from a home network router, the first bandwidth allocation being associated with a first multimedia stream between the gaming host and a first client system coupled to the home network router;
receiving at the home network router the request for the first bandwidth allocation from the gaming host;
determining by the home network router whether a first available bandwidth for data traffic between the gaming host and the first client system is greater than or less than the first bandwidth allocation;
in response to determining that the first available bandwidth is greater than the first bandwidth allocation:
allocating the first bandwidth allocation for data traffic between the gaming host and the first client system; and
providing a first indication to the gaming host that the first bandwidth allocation is allocated for data traffic between the gaming host and the first client system; and
ceasing to provide the first multimedia stream to the first client system; and providing a second indication to the home network router to deallocate the first bandwidth allocation for data traffic between the gaming host and the first client system.

9. The method of claim 8, wherein:
in response to determining that the first available bandwidth is less than the first bandwidth allocation, the method further comprises:
allocating a second bandwidth allocation for data traffic between the gaming host and the first client system, wherein the second bandwidth allocation is less than the first bandwidth allocation; and
providing a second indication to the gaming host that the second bandwidth allocation is allocated for traffic between the gaming host and the first client system;
the method further comprising:
receiving the second indication from the home network router; and
in response to receiving the second indication:
operating on the first multimedia stream to provide a second multimedia stream, wherein the second multimedia stream is within the second bandwidth allocation; and
providing the second multimedia stream to the home network router for routing to the first client system.

10. The method of claim 9, wherein operating on the first multimedia stream comprises reducing a frame rate of the first multimedia stream.

11. The method of claim 9, wherein operating on the first multimedia stream comprises reducing a resolution of the first multimedia stream.

12. The method of claim 9, wherein operating on the first multimedia stream comprises reducing a compression of the first multimedia stream.

13. The method of claim 8, further comprising:
determining that a second available bandwidth for traffic between the gaming host and the first client system is less than the first available bandwidth;
determining if the second available bandwidth is less than the first bandwidth allocation; and
in response to determining that the second available bandwidth is less than the first bandwidth allocation:
allocating a second bandwidth allocation for data traffic between the gaming host and the first client system, wherein the second bandwidth allocation is less than the first bandwidth allocation; and
providing a second indication to the gaming host that the second bandwidth allocation is allocated for traffic between the gaming host and the first client system;
receiving the second indication from the home network router; and
in response to receiving the second indication:
operating on the first multimedia stream to provide a second multimedia stream, wherein the second multimedia stream is within the second bandwidth allocation; and
providing the second multimedia stream to the home network router for routing to the first client system;
allocating the first bandwidth allocation for data traffic between the gaming host and the first client system; and providing a first indication to the gaming host that the first bandwidth allocation is allocated for data traffic between the gaming host and the first client system.

14. The method of claim 8, further comprising:
requesting a second bandwidth allocation from the home network router, the second bandwidth allocation being associated with a second multimedia stream between the gaming host and a second client system coupled to the home network router;
providing the second multimedia stream to the home network router for routing to the second client system, wherein the second multimedia stream is within the second bandwidth allocation;
receiving the request for the second bandwidth allocation from the gaming host;
determining whether a second available bandwidth for data traffic between the gaming host and the second client system is greater than or less than the second bandwidth allocation; and
in response to determining that the second available bandwidth is greater than the second bandwidth allocation:
allocating the second bandwidth allocation for data traffic between the gaming host and the second client system; and
providing a second indication to the gaming host that the second bandwidth allocation is allocated for data traffic between the gaming host and the second client system.

15. A non-transitory computer-readable medium including code for carrying out a method, the method comprising:
requesting by a gaming host a first bandwidth allocation from a home network router, the first bandwidth allocation being associated with a first multimedia stream between the gaming host and a first client system coupled to the home network router;
receiving at the home network router the request for the first bandwidth allocation from the gaming host;
determining by the home network router whether a first available bandwidth for data traffic between the gaming host and die first client system is greater than or less than the first bandwidth allocation;
in response to determining that the first available bandwidth is greater than the first bandwidth allocation:
allocating the first bandwidth allocation for data traffic between the gaming host and the first client system; and
providing a first indication to the gaming host that the first bandwidth allocation is allocated for data traffic between the gaming host and the first client system; and
providing the first multimedia stream to the home network router for routing to the first client system, wherein the first multimedia stream is within the first bandwidth allocation;
ceasing to provide the first multimedia stream to the first client system; and providing a second indication to the home network router to deallocate the first bandwidth allocation for data traffic between the gaming hose and the first client system.

16. The computer-readable medium of claim 15, the method further comprising:
in response to determining that the first available bandwidth is less than the first bandwidth allocation, the method further comprises:
allocating a second bandwidth allocation for data traffic between the gaming host and the first client system, wherein the second bandwidth allocation is less than the first bandwidth allocation; and
providing a second indication to the gaming host that the second bandwidth allocation is allocated for traffic between the gaming host and the first client system;
receiving the second indication from the home network router; and
in response to receiving the second indication:
operating on the first multimedia stream to provide a second multimedia stream, wherein the second multimedia stream is within the second bandwidth allocation; and
providing the second multimedia stream to the home network router for routing to the first client system.

17. The computer-readable medium of claim 15, the method further comprising:
determining that a second available bandwidth for traffic between the gaming host and the first client system is less than the first available bandwidth;
determining if the second available bandwidth is less than the first bandwidth allocation; and
in response to determining that the second available bandwidth is less than the first bandwidth allocation:
allocating a second bandwidth allocation for data traffic between the gaming host and the first client system, wherein the second bandwidth allocation is less than the first bandwidth allocation; and
providing a second indication to the gaming host that the second bandwidth allocation is allocated for traffic between the gaming host and the first client system;
receiving the second indication from the home network router; and
in response to receiving the second indication:
operating on the first multimedia stream to provide a second multimedia stream, wherein the second multimedia stream is within the second bandwidth allocation;
providing the second multimedia stream to the home network router for routing to the first client system;
allocating the first bandwidth allocation for data traffic between the gaming host and the first client system; and
providing a first indication to the gaming host that the first bandwidth allocation is allocated for data traffic between the gaming host and the first client system.

* * * * *